United States Patent
Conway et al.

(10) Patent No.: US 9,083,804 B2
(45) Date of Patent: *Jul. 14, 2015

(54) OPTIMIZED PREDICTIVE ROUTING AND METHODS

(71) Applicant: Mattersight Corporation, Chicago, IL (US)

(72) Inventors: Kelly Conway, Lake Bluff, IL (US); David Gustafson, Lake Bluff, IL (US); Douglas Brown, Austin, TX (US); Michael Glen Gates, Lakeway, TX (US); William Duane Skeen, Austin, TX (US); Brendan Joyce, Chicago, IL (US); Christopher Danson, Austin, TX (US)

(73) Assignee: MATTERSIGHT CORPORATION, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/049,008

(22) Filed: Oct. 8, 2013

(65) Prior Publication Data

US 2014/0355749 A1    Dec. 4, 2014

Related U.S. Application Data

(63) Continuation of application No. 13/903,559, filed on May 28, 2013.

(51) Int. Cl.
*H04M 3/523*    (2006.01)
(52) U.S. Cl.
CPC ..................... *H04M 3/523* (2013.01)
(58) Field of Classification Search
CPC .................................................. H04M 3/523
USPC ................ 379/265.1–265.14, 266.01–266.03
See application file for complete search history.

(56) References Cited

U.S. PATENT DOCUMENTS

| | | | |
|---|---|---|---|
| 4,455,455 A | 6/1984 | Little | |
| 5,291,550 A | 3/1994 | Levy et al. | |
| 5,692,033 A | 11/1997 | Farris | |
| 5,987,415 A | 11/1999 | Breese et al. | |
| 6,134,315 A | 10/2000 | Galvin | |
| 6,163,607 A | 12/2000 | Bogart et al. | |
| 6,173,053 B1 | 1/2001 | Bogart et al. | |
| 6,301,242 B1 | 10/2001 | Lindsay et al. | |
| 6,359,982 B1 * | 3/2002 | Foster et al. | 379/266.06 |
| 6,411,687 B1 | 6/2002 | Bohacek et al. | |
| 6,563,920 B1 | 5/2003 | Flockhart et al. | |

(Continued)

OTHER PUBLICATIONS

WIPO, PCT/US2014/39387, "International Search Report," Oct. 10, 2014, 3 pages.

(Continued)

*Primary Examiner* — Harry S Hong
(74) *Attorney, Agent, or Firm* — Haynes and Boone LLP

(57) ABSTRACT

The methods, apparatus, and systems described herein facilitate optimizing routing decisions. The methods include retrieving and/or predicting a profile of a current customer and future customers, determining which agents are currently available and which agents are expected to be available, and providing a routing recommendation based on the profile retrieval or prediction for the current customer and the future customers, and the currently available agents' and expected available agents' proficiency at handling customers with the retrieved and/or predicted profiles.

26 Claims, 5 Drawing Sheets

(56) References Cited

U.S. PATENT DOCUMENTS

| | | |
|---|---|---|
| 7,023,979 B1 | 4/2006 | Wu et al. |
| 7,054,434 B2 | 5/2006 | Rodenbusch et al. |
| 7,110,525 B1 | 9/2006 | Heller et al. |
| 7,127,058 B2 | 10/2006 | O'Connor et al. |
| 7,184,540 B2 | 2/2007 | Dezonno et al. |
| 7,197,132 B2 | 3/2007 | Dezonno et al. |
| 7,215,745 B2 | 5/2007 | Peters |
| 7,406,515 B1 | 7/2008 | Joyce et al. |
| 7,849,115 B2 | 12/2010 | Reiner |
| 7,949,552 B2 * | 5/2011 | Korenblit et al. ............ 705/7.13 |
| 8,295,471 B2 | 10/2012 | Spottiswoode et al. |
| 8,340,274 B2 | 12/2012 | Saushkin |
| 8,346,593 B2 | 1/2013 | Fanelli et al. |
| 8,433,597 B2 | 4/2013 | Chishti et al. |
| 8,472,611 B2 | 6/2013 | Chishti |
| 8,565,410 B2 | 10/2013 | Chishi et al. |
| 2004/0213400 A1 * | 10/2004 | Golitsin et al. .......... 379/265.12 |
| 2005/0135593 A1 * | 6/2005 | Becerra et al. ........... 379/220.01 |
| 2005/0135600 A1 | 6/2005 | Whitman, Jr. |
| 2006/0025995 A1 | 2/2006 | Erhart et al. |
| 2006/0098803 A1 | 5/2006 | Bushey et al. |
| 2007/0036323 A1 * | 2/2007 | Travis ........................... 379/219 |
| 2008/0240376 A1 | 10/2008 | Conway et al. |
| 2009/0240647 A1 | 9/2009 | Green et al. |
| 2010/0020959 A1 * | 1/2010 | Spottiswoode ............ 379/265.1 |
| 2010/0269051 A1 | 10/2010 | Horvitz et al. |
| 2010/0274618 A1 | 10/2010 | Byrd et al. |
| 2010/0332287 A1 | 12/2010 | Gates et al. |

OTHER PUBLICATIONS

WIPO, PCT/US2010/39387, "Written opinion of the International Searching Authority," Oct. 10, 2014, 6 pages.

* cited by examiner

OPTIMIZED PREDICTIVE ROUTING AND METHODS

CROSS-REFERENCE TO RELATED APPLICATION

This application is a continuation of U.S. application Ser. No. 13/903,559 filed May 28, 2013, the entire contents of which is hereby incorporated here in its entirety by express reference thereto.

TECHNICAL FILED

The present disclosure generally relates to a method, apparatus, and system for routing customer communications, and more particularly to optimizing routing recommendations based on retrieved and/or predicted customer profiles and agent availability.

BACKGROUND OF THE DISCLOSURE

Call-routing ability and efficiency is important. The time it takes to connect a caller to an agent affects customer satisfaction and hence business image. Mistakes in routing, connecting callers for example to overloaded centers or to agents not prepared to help with the client's difficulty or desire, is troublesome.

Automatic call distribution systems are known. Often an organization disseminates a single telephone number to its customers and to the public in general as a means of contacting the organization. As calls are directed to the organization from the public switch telephone network, the automatic call distribution system directs the calls to its agents based upon some type of criteria. For example, where all agents are considered equal, the automatic call distributor may distribute the calls based upon which agent has been idle the longest.

Automatic call distributors are used in communications handling centers, such as telephone call centers, that forward incoming communications, such as telephone calls, for processing by one of several associated call-handling agents. Other communications centers may be used to forward voice-over-internet protocol communications; electronic mail messages; facsimiles or the like, to associated handling agents.

One concern in designing an automatic call distributor system is ensuring that calls are efficiently routed to an agent, so as to minimize the amount of time that any particular call is placed on hold. One basic technique of minimizing on-hold time is to employ a first-in/first-out call handling technique. The first-in/first-out technique requires that calls be routed to the next available agent in the order in which the calls are received. In many cases, however, the first-in/first-out technique is not appropriate. For example, there may be agents with specialized knowledge or expertise. Utilizing a first-in/first-out technique in such a situation is inappropriate because a caller with a specific question related to a specific area may be routed to an agent not having specialized knowledge in that area. Moreover, even within a group of generally equally skilled agents, there is performance variability that conventional routing techniques cannot account for without becoming inefficient. Improvements in routing techniques and speeds are therefore needed.

SUMMARY

While the traditional goal of a contact center is to plan, staff, and manage around how quickly a customer contact is answered, the present disclosure seeks in one embodiment to manage a tradeoff between the average speed of an answer and a better agent for taking a call. A customer calls, or otherwise communicates with a contact center. The profile of the customer is retrieved and/or predicted using, for example, identifying origination data from the customer communication. The profile of a future customer is also predicted. Agents currently available to handle the customer communication are determined and ranked. Agents that are expected to be available in the future are determined and ranked. A routing recommendation is provided based on the retrieved and/or predicted profiles of the current and future customers and the currently available agents' and expected available agents' proficiency at handling customers with the retrieved and/or predicted profiles.

The systems, apparatus, and methods disclosed herein may be used to distribute customer tasks or communications to an agent based on retrieved and/or predicted customer profile and other factors, while taking into account future customers. The present disclosure describes how to efficiently route customer communications, increase customer satisfaction, and maximize contact center performance.

In a first aspect, the invention encompasses a system adapted to optimize the routing of incoming customer communications that includes a node comprising a processor and a computer readable medium operably coupled thereto, the computer readable medium comprising a plurality of instructions stored in association therewith that are accessible to, and executable by, the processor, where the plurality of instructions includes, instructions, that when executed, receive a customer task, instructions, that when executed, retrieve or predict a first profile of the customer associated with the customer communication and predict a second profile of a future customer, and instructions, that when executed, provide a routing recommendation modified by (including being based on) retrieved and/or predicted customer profiles, and currently available agents' and expected available agents' proficiency at handling customers with the retrieved and/or predicted profiles.

In a second aspect, the invention encompasses a system for optimizing the routing of incoming customer communications, that includes a database module to retrieve or predict a first profile of a current customer and predict a second profile of a future customer, respectively, based on historical customer communications and/or identifying origination data, a governor module to monitor agent work load and provide a list of currently available agents and expected available agents, and a routing module to match customer communications to agents based on the retrieved and/or predicted first and second profiles of the current and future customers and the currently available agents' and expected available agents' proficiency at handling customers with the retrieved and/or predicted profiles.

In a third aspect, the invention encompasses a method to optimize routing incoming customer communications that includes, receiving a customer communication, retrieving or predicting a first profile of the customer associated with the customer communication, predicting a second profile of a future customer, determining which agents of a plurality of agents are currently available and which agents of the plurality of agents are expected to be available, and providing a routing recommendation based on the first and second profiles retrieved and/or predicted and the plurality of currently available agents' and plurality of expected available agents' proficiency at handling customers with the retrieved and/or predicted personality profiles.

In a fourth aspect, the invention encompasses a computer readable medium comprising a plurality of instructions that includes instructions, that when executed, receive a customer communication, instructions, that when executed, retrieve or predict a first profile of the customer associated with the customer communication and predict a second profile of a future customer, instructions, that when executed, determine which agents are currently available and which agents are expected to be available, instructions, that when executed, determine the currently available agents' and expected available agents' proficiency at handling customers with the predicted second profiles, and instructions, that when executed, provide a recommendation that directs the customer communication to an agent based on the retrieved and/or predicted first and second profiles of the current customer and future customer and the available agents' proficiency at handling customers with the retrieved and/or predicted first and second profiles.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE PREFERRED EMBODIMENTS

Figure 1:
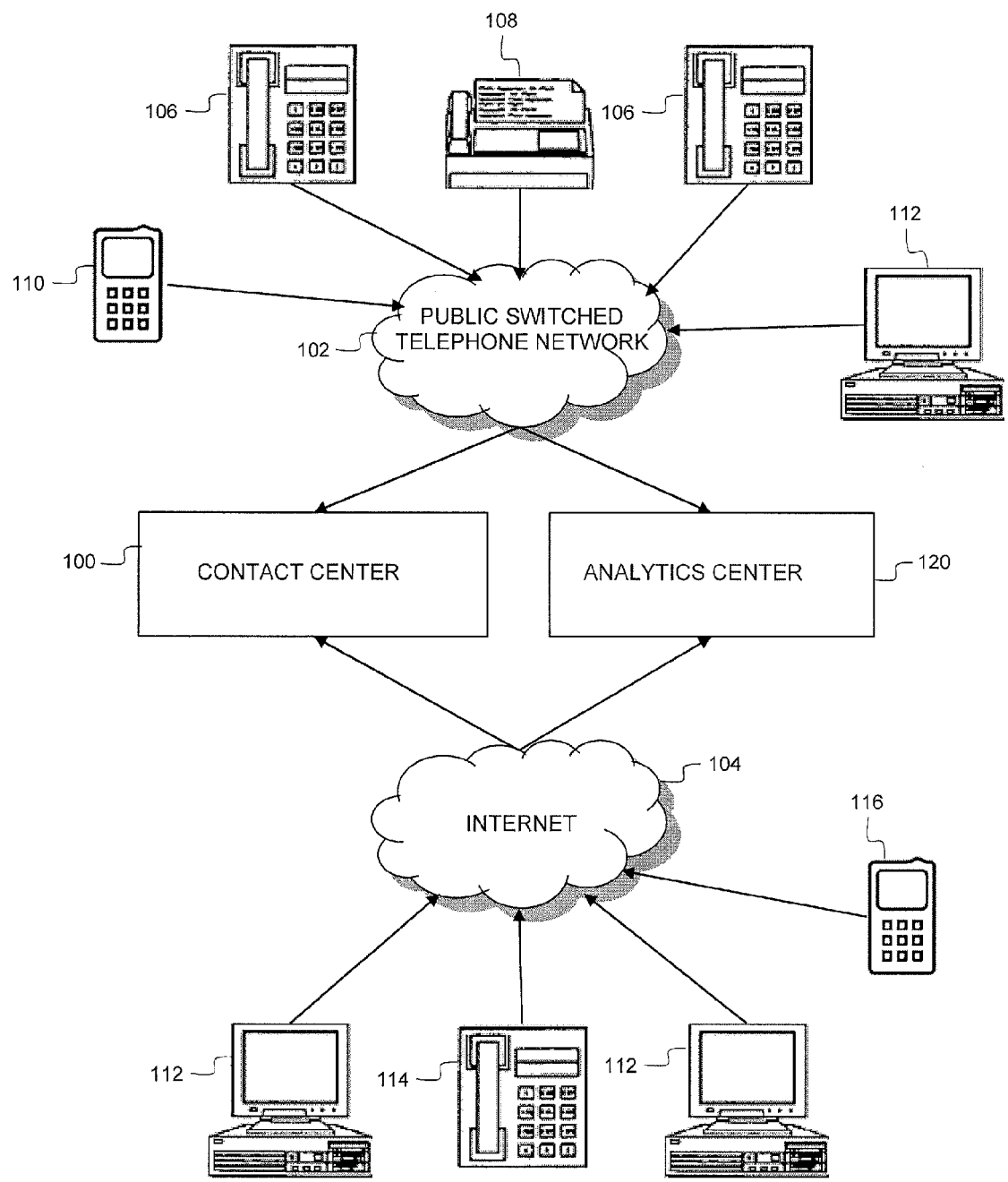
FIG. 1 is a simplified block diagram of an embodiment of a contact center according to various aspects of the present disclosure.

The present disclosure advantageously provides for methods of optimizing the routing of incoming customer communications. These methods typically include receiving a customer communication, predicting or retrieving a profile of the customer associated with the customer communication, predicting a profile of a future customer, determining which agents are currently available and which agents are expected to be available, and providing a routing recommendation, which is typically based on the profile predictions of the current customer and the future customer or based on the retrieved customer profile of the current customer and the predicted profile of the future customer, and the currently available agents' and the expected available agents' proficiency at handling customers with the retrieved and/or predicted profiles.

Systems and apparatuses for carrying out these methods are also part of the present disclosure. An exemplary system to route incoming customer communications and tasks includes, for example, a node including a processor and a computer readable medium operably coupled thereto, the computer readable medium comprising a plurality of instructions stored in association therewith that are accessible to, and executable by, the processor, where the plurality of instructions includes instructions, that when executed, receive a customer communication, provide a list of currently available agents and a list of expected available agents, and provide a routing recommendation modified by (including being based on) predicted customer profiles of current and future customers or retrieved customer profiles of current customers and predicted profiles of future customers, and currently available agents' and expected available agents' proficiency at handling customers with the predicted or retrieved profiles.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one of ordinary skill in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a simplified block diagram of an embodiment of a contact center 100 according to various aspects of the present disclosure. A "contact center" as used herein can include any facility or system server suitable for receiving and recording electronic communications from customers. Such customer communications can include, for example, telephone calls, facsimile transmissions, e-mails, web interactions, voice over IP ("VoIP") and video. Various specific types of communications contemplated through one or more of these channels include, without limitation, email, SMS data (e.g., text), tweet, instant message, web-form submission, smartphone app, social media data, and web content data (including but not limited to internet survey data, blog data, microblog data, discussion forum data, and chat data), etc. In some embodiments, the communications can include customer tasks, such as taking an order, making a sale, responding to a complaint, etc. In various aspects, real-time communication, such as voice, video, or both, is preferably included. It is contemplated that these communications may be transmitted by and through any type of telecommunication device and over any medium suitable for carrying data. For example, the communications may be transmitted by or through telephone lines, cable, or wireless communications. As shown in FIG. 1, the contact center 100 of the present disclosure is adapted to receive and record varying electronic communications and data formats that represent an interaction that may occur between a customer (or caller) and a contact center agent during fulfillment of a customer and agent transaction. In one embodiment, the contact center 100 records all of the customer calls in uncompressed audio formats. In the illustrated embodiment, customers may communicate with agents associated with the contact center 100 via multiple different communication networks such as a public switched telephone network (PSTN) 102 or the Internet 104. For example, a customer may initiate an interaction session through traditional telephones 106, a fax machine 108, a cellular (i.e., mobile) telephone 110, a personal computing device 112 with a modem, or other legacy communication device via the PSTN 102. Further, the contact center 100 may accept internet-based interaction sessions from personal computing devices 112, VoIP telephones 114, and internet-enabled smartphones 116 and personal digital assistants (PDAs).

Often, in contact center environments such as contact center 100, it is desirable to facilitate routing of customer contacts, particularly based on agent availability, prediction of profile (e.g., personality type) of the customer occurring in association with a customer interaction, be it a telephone-based interaction, a web-based interaction, or other type of electronic interaction over the PSTN 102 or Internet 104. Traditionally, limited categories of customer data are used to create predictive models. As a result, such models tend not to be as accurate as possible because of limited data inputs and because of the heterogeneous nature of interaction data collected across multiple different communication channels.

As one of ordinary skill in the art would recognize, the illustrated example of communication channels associated with a contact center 100 in FIG. 1 is just an example, and the contact center may accept customer interactions, and other analyzed interaction information and/or routing recommendations from an analytics center, through various additional and/or different devices and communication channels whether or not expressly described herein.

For example, in some embodiments, internet-based interactions and/or telephone-based interactions may be routed through an analytics center 120 before reaching the contact center 100 or may be routed simultaneously to the contact center and the analytics center (or even directly and only to the contact center). In some instances, the analytics center 120 is a third-party analytics company that captures multi-channel interaction data associated with the contact center 100 and applies predictive analytics to the data to generate actionable intelligence for the contact center. For example, the analytics center 120 may provide a routing recommendation according to the present disclosure, a database module to associate identifying origination data of a current customer with a pre-existing customer profile and/or generate a prediction of a profile (e.g., personality type) of the customer and a future customer, a governor module to monitor agent work load and provide a list of currently available agents and expected available agents, and a routing module to match customer communications to currently available agents and expected available agents based on the predicted customer profile or pre-existing customer profile of the current customer and predicted customer profile of the future customer, and the currently available agents' and expected available agents' proficiency at handling customers with the pre-existing or predicted profiles (e.g., personality type), or any combination thereof, as well as providing all of the above functionality. Also, in some embodiments, internet-based interactions may be received and handled by a marketing department associated with either the contact center 100 or analytics center 120. The analytics center 120 may be controlled by the same entity or a different entity than the contact center 100. Further, the analytics center 120 may be a part of, or independent of, the contact center 100.

Figure 2:
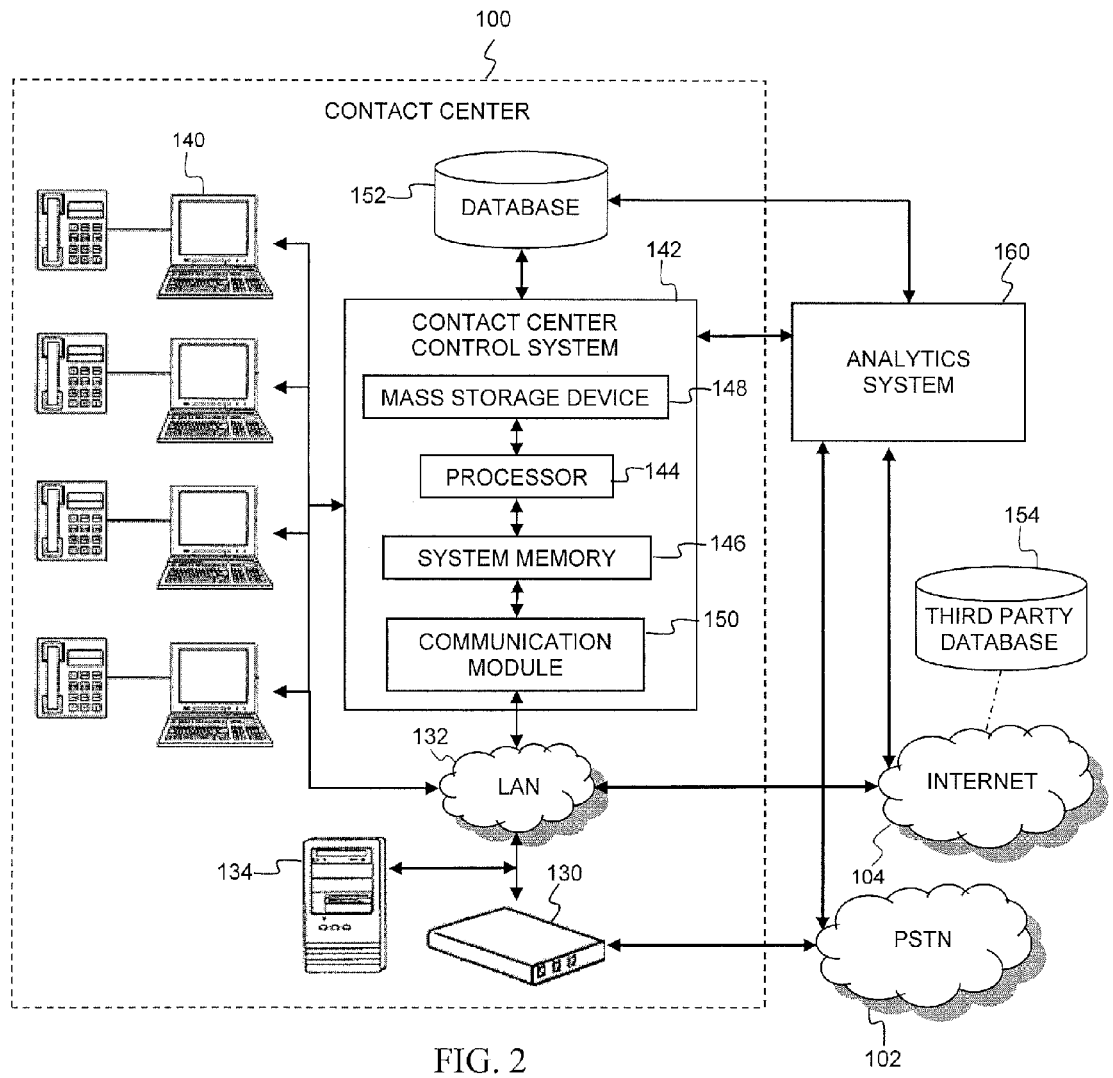
FIG. 2 is a more detailed block diagram of the contact center of FIG. 1 according to aspects of the present disclosure.

FIG. 2 is a more detailed block diagram of an embodiment of the contact center 100 according to aspects of the present disclosure. As shown in FIG. 2, the contact center 100 is communicatively coupled to the PSTN 102 via a distributed private branch exchange (PBX) switch 130. The PBX switch 130 provides an interface between the PSTN 102 and a local area network (LAN) 132 within the contact center 100. In general, the PBX switch 130 connects trunk and line station interfaces of the PSTN 102 to components communicatively coupled to the LAN 132. The PBX switch 130 may be implemented with hardware or virtually. A hardware-based PBX may be implemented in equipment located local to the user of the PBX system. In contrast, a virtual PBX may be implemented in equipment located at a central telephone service provider that delivers PBX functionality as a service over the PSTN 102. Additionally, in one embodiment, the PBX switch 130 may be controlled by software stored on a telephony server 134 coupled to the PBX switch. In another embodiment, the PBX switch 130 may be integrated within telephony server 134. The telephony server 134 incorporates PBX control software to control the initiation and termination of connections between telephones within the contact center 100 and outside trunk connections to the PSTN 102. In addition, the software may monitor the status of all telephone stations coupled to the LAN 132 and may be capable of responding to telephony events to provide traditional telephone service. In certain embodiments, this may include the control and generation of the conventional signaling tones including without limitation dial tones, busy tones, ring back tones, as well as the connection and termination of media streams between telephones on the LAN 132. Further, the PBX control software may programmatically implement standard PBX functions such as the initiation and termination of telephone calls, either across the network or to outside trunk lines, the ability to put calls on hold, to transfer, park and pick up calls, to conference multiple callers, and to provide caller ID information. Telephony applications such as voice mail and auto attendant may be implemented by application software using the PBX as a network telephony services provider.

In one embodiment, the telephony server 134 includes a trunk interface that utilizes conventional telephony trunk transmission supervision and signaling protocols required to interface with the outside trunk circuits from the PSTN 102. The trunk lines carry various types of telephony signals such as transmission supervision and signaling, audio, fax, or modem data to provide plain old telephone service (POTS). In addition, the trunk lines may carry other communication formats such T1, ISDN or fiber service to provide telephony or multimedia data images, video, text or audio.

The telephony server 134 includes hardware and software components to interface with the LAN 132 of the contact center 100. In one embodiment, the LAN 132 may utilize IP telephony, which integrates audio and video stream control with legacy telephony functions and may be supported through the H.323 protocol. H.323 is an International Telecommunication Union (ITU) telecommunications protocol that defines a standard for providing voice and video services over data networks. H.323 permits users to make point-to-point audio and video phone calls over a local area network. IP telephony systems can be integrated with the public telephone system through an IP/PBX-PSTN gateway, thereby allowing a user to place telephone calls from an enabled computer. For example, a call from an IP telephony client within the contact center 100 to a conventional telephone outside of the contact center would be routed via the LAN 132 to the IP/PBX-PSTN gateway. The IP/PBX-PSTN gateway would then translate the H.323 protocol to conventional telephone protocol and route the call over the PSTN 102 to its destination. Conversely, an incoming call from a customer over the PSTN 102 may be routed to the IP/PBX-PSTN gateway, which translates the conventional telephone protocol to H.323 protocol so that it may be routed to a VoIP-enable phone or computer within the contact center 100.

The contact center 100 is further communicatively coupled to the Internet 104 via hardware and software components within the LAN 132. One of ordinary skill in the art would recognize that the LAN 132 and the connections between the contact center 100 and external networks such as the PSTN 102 and the Internet 104 as illustrated by FIG. 2 have been simplified for the sake of clarity and the contact center may include various additional and/or different software and hardware networking components such as routers, switches, gateways, network bridges, hubs, and legacy telephony equipment.

In various embodiments, the contact center 100 includes a communication distributor that distributes customer communications or tasks to agents. Generally, the communication distributor is part of a switching system designed to receive customer communications and queue them. In addition, the communication distributor distributes communications to agents or specific groups of agents according to a prearranged scheme.

As shown in FIG. 2, the contact center 100 includes a plurality of agent workstations 140 that enable agents employed by the contact center 100 to engage in customer interactions over a plurality of communication channels. In one embodiment, each agent workstation 140 may include at least a telephone and a computer workstation. In other embodiments, each agent workstation 140 may include a computer workstation that provides both computing and telephony functionality. Through the workstations 140, the agents may engage in telephone conversations with the customer, respond to email inquiries, receive faxes, engage in instant message conversations, respond to website-based inquires, video chat with a customer, and otherwise participate in various customer interaction sessions across one or more channels. Further, in some embodiments, the agent workstations 140 may be remotely located from the contact center 100, for example, in another city, state, or country. Alternatively, in some embodiments, an agent may be a software-based application configured to interact in some manner with a customer. An exemplary software-based application as an agent is an online chat program designed to interpret customer inquiries and respond with pre-programmed answers.

The contact center 100 further includes a contact center control system 142 that is generally configured to provide recording, voice analysis, behavioral analysis, storage, and other processing functionality to the contact center. In the illustrated embodiment, the contact center control system 142 is an information handling system such as a computer, server, workstation, mainframe computer, or other suitable computing device. In other embodiments, the control system 142 may be a plurality of communicatively coupled computing devices coordinated to provide the above functionality for the contact center 100. The control system 142 includes a processor 144 that is communicatively coupled to a system memory 146, a mass storage device 148, and a communication module 150. The processor 144 can be any custom made or commercially available processor, a central processing unit (CPU), an auxiliary processor among several processors associated with the control system 142, a semiconductor-based microprocessor (in the form of a microchip or chip set), a macroprocessor, a collection of communicatively coupled processors, or any device for executing software instructions. The system memory 146 provides the processor 144 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data, such as known voice prints, may be stored on the mass storage device 148. Examples of mass storage devices may include hard discs, optical disks, magneto-optical discs, solid-state storage devices, tape drives, CD-ROM drives, and/or a variety other mass storage devices known in the art. Further, the mass storage device may be implemented across one or more network-based storage systems, such as a storage area network (SAN). The communication module 150 is operable to receive and transmit contact center-related data between local and remote networked systems and communicate information such as customer interaction recordings between the other components coupled to the LAN 132. Examples of communication modules may include Ethernet cards, 802.11 WiFi devices, cellular data radios, and/or other suitable devices known in the art. The contact center control system 142 may further include any number of additional components, which are omitted for simplicity, such as input and/or output (I/O) devices (or peripherals), buses, dedicated graphics controllers, storage controllers, buffers (caches), and drivers. Further, functionality described in association with the control system 142 may be implemented in software (e.g., computer instructions), hardware (e.g., discrete logic circuits, application specific integrated circuit (ASIC) gates, programmable gate arrays, field programmable gate arrays (FPGAs), etc.), or a combination of hardware and software.

According to one aspect of the present disclosure, the contact center control system 142 is configured to record, collect, and analyze customer voice data and other structured and unstructured data, and other tools may be used in association therewith to increase efficiency and efficacy of the contact center. As an aspect of this, the control system 142 is operable to record unstructured interactions between customers and agents occurring over different communication channels including without limitation telephone conversations, email exchanges, website postings, social media communications, smartphone application (i.e., app) communications, fax messages, instant message conversations. For example, the control system 142 may include a hardware or software-based recording server to capture the audio of a standard or VoIP telephone connection established between an agent workstation 140 and an outside customer telephone system. Further, the audio from an unstructured telephone call or video conference session may be transcribed manually or automatically and stored in association with the original audio or video. In one embodiment, multiple communication channels (i.e., multi-channel) may be used according to the invention, either in real-time to collect information, for evaluation, or both. For example, control system 142 can receive, evaluate, and store telephone calls, emails, and fax messages. Thus, multi-channel can refer to multiple channels of interaction data, or analysis using two or more channels, depending on the context herein.

In addition to unstructured interaction data such as interaction transcriptions, the control system 142 is configured to captured structured data related to customers, agents, and their interactions. For example, in one embodiment, a "cradle-to-grave" recording may be used to record all information related to a particular telephone call from the time the call enters the contact center to the later of: the caller hanging up or the agent completing the transaction. All or a portion of the interactions during the call may be recorded, including interaction with an interactive voice response (IVR) system, time spent on hold, data keyed through the caller's key pad, conversations with the agent, and screens displayed by the agent at his/her station during the transaction. Additionally, structured data associated with interactions with specific customers may be collected and associated with each customer, including without limitation the number and length of calls placed to the contact center, call origination information, reasons for interactions, outcome of interactions, average hold time, agent actions during interactions with customer, manager escalations during calls, types of social media interactions, number of distress events during interactions, survey results, and other interaction information. In addition to collecting interaction data associated with a customer, the control system 142 is also operable to collect biographical profile information specific to a customer including without limitation customer phone number, account/policy numbers, address, employment status, income, gender, race, age, education, nationality, ethnicity, marital status, credit score, customer "value" data (i.e., customer tenure, money spent as customer, etc.), personality type (as determined by past interactions), and other relevant customer identification and biological information. The control system 142 may also collect agent-specific unstructured and structured data including without limitation agent personality type, gender, language skills, performance data (e.g., customer retention rate, etc.), tenure and salary data, training level, average hold time during interactions, manager escalations, agent workstation utilization, and any other agent data relevant to contact center performance. Additionally, one of ordinary skill in the art would recognize that the types of data collected by the contact center control system 142 that are identified above are simply examples and additional and/or different interaction data, customer data, agent data, and telephony data may be collected and processed by the control system 142.

The control system 142 may store recorded and collected interaction data in a database 152, including customer data and agent data. In certain embodiments, agent data, such as agent scores for dealing with customers, are updated daily.

The control system 142 may store recorded and collected interaction data in a database 152. The database 152 may be any type of reliable storage solution such as a RAID-based storage server, an array of hard disks, a storage area network of interconnected storage devices, an array of tape drives, or some other scalable storage solution located either within the contact center or remotely located (i.e., in the cloud). Further, in other embodiments, the contact center control system 142 may have access not only to data collected within the contact center 100 but also data made available by external sources such as a third party database 154. In certain embodiments, the control system 142 may query the third party database for customer data such as credit reports, past transaction data, and other structured and unstructured data.

Additionally, in some embodiments, an analytics system 160 may also perform some or all of the functionality ascribed to the contact center control system 142 above. For instance, the analytics system 160 may record telephone and internet-based interactions, perform behavioral analyses, predict customer personalities or customer profiles, retrieve pre-existing customer profiles, and perform other contact center-related computing tasks, as well as combinations thereof. The analytics system 160 may be integrated into the contact center control system 142 as a hardware or software module and share its computing resources 144, 146, 148, and 150, or it may be a separate computing system housed, for example, in the analytics center 120 shown in FIG. 1. In the latter case, the analytics system 160 includes its own processor and non-transitory computer-readable storage medium (e.g., system memory, hard drive, etc.) on which to store predictive analytics software and other software instructions.

The multi-channel interaction data collected in the context of the control center 100 may be subject to a linguistic-based psychological behavioral model to assess the personality of customers and agents associated with the interactions. For example, such a behavioral model may be applied to the transcription of a telephone call, instant message conversation, or email thread, between a customer and agent to gain insight into why a specific outcome resulted from the interaction.

In one embodiment, interaction data is mined for behavioral signifiers associated with a linguistic-based psychological behavioral model. In particular, the contact center control system 142 searches for and identifies text-based keywords (i.e., behavioral signifiers) relevant to a predetermined psychological behavioral model. In a preferred embodiment, multi-channels are mined for such behavioral signifiers.

Figure 3:
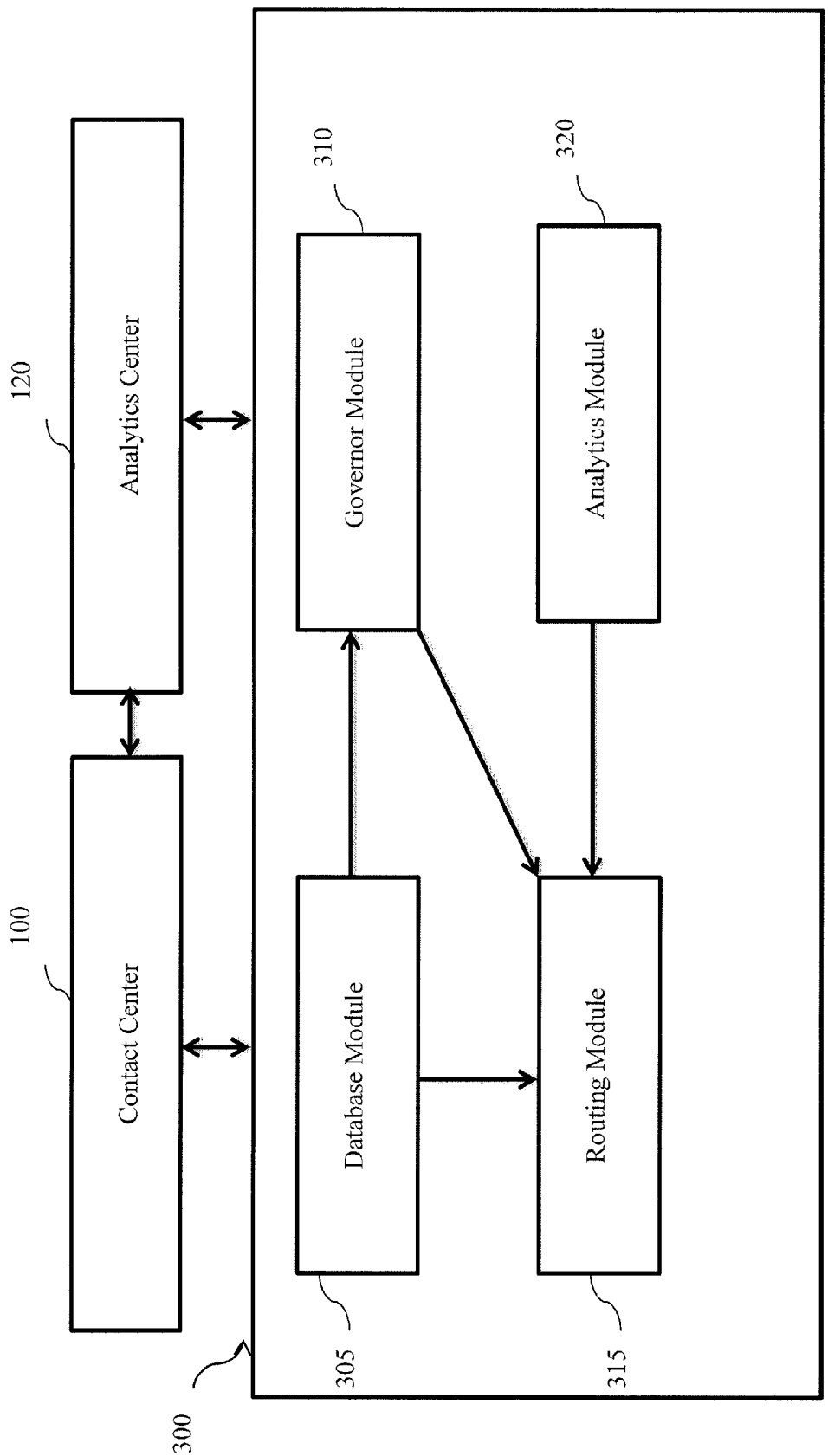
FIG. 3 is simplified block diagram of an embodiment of a contact center, analytics center, and a system for routing customer communications according to various aspects of the present disclosure.

FIG. 3 illustrates an exemplary predictive routing system 300 operatively associated with contact center 100. In one embodiment, parts or the whole of predictive routing system 300 is integrated into contact center 100. In another embodiment, parts or the whole of predictive routing system 300 is operated separately from contact center 100, such as by a processing/analytics company (i.e., in this unshown embodiment, the contact center 100 may be replaced with an analytics center 120 in whole or in part), and predictive routing system 300 provides routing recommendations to contact center 100. As shown, predictive routing system 300 includes database module 305, governor module 310, routing module 315, and analytics module 320.

As shown, database module 305 receives customer communication data from contact center 100, and independently predicts the profile of the current customer and future customers. It should be understood, with reference to the guidance of the present disclosure, that a prediction of a profile of one or more future customers typically involves a probability as to the likelihood of a future customer having a certain type of particular profile, such as based on any one or more of the profile variables discussed herein. For example, the profile of the future customer can be that of the probability of a male calling in the next 2 minutes, or the probability of an emotion-based caller being the next call to be received. The customer profile includes information such as race, age, education, accent, income, nationality, ethnicity, area code, zip code, marital status, job status, credit score, personality type, gender, distress level, task type, likelihood of purchase, contact time, likelihood of attrition/account closure, and/or customer satisfaction.

The database module 305, in some embodiments, associates identifying origination data of the current customer with a prediction of what the profile (e.g., personality type) the current customer is likely to be. Identifying origination data typically includes a contact number or network address, or any combination thereof. The contact number may include at least one of a telephone number, a text message number, short message service (SMS) number, multimedia message service (MMS) number, or a combination thereof. The network address can include at least one of an email address, electronic messaging address, voice over IP address, IP address, social media identifier (e.g., Facebook identifier, Twitter identifier, chat identifier), or a combination thereof. These identifiers are associated with personality types based on the linguistic model.

It is well known that certain psychological behavioral models have been developed as tools to evaluate and understand how and/or why one person or a group of people interacts with another person or group of people. The Process Communication Model™("PCM") developed by Dr. Taibi Kahler is a preferred example of one such behavioral model. Specifically, PCM presupposes that all people fall primarily into one of six basic personality types: Reactor, Workaholic, Persister, Dreamer, Rebel and Promoter. Although each person is one of these six types, all people have parts of all six types within them arranged like a "six-tier configuration." Each of the six types learns differently, is motivated differently, communicates differently, and has a different sequence of negative behaviors in which they engage when they are in distress. Importantly each PCM personality type responds positively or negatively to communications that include tones or messages commonly associated with another of the PCM personality types. Thus, an understanding of a communicant's PCM personality type offers guidance as to an appropriate responsive tone or message. Exemplary methods of applying a psychological behavioral model to contact center communications are described in U.S. Pat. Nos. 7,995,717 and 8,094,803, and U.S. patent application Ser. No. 13/782,522, filed Mar. 1, 2013, entitled "Customer-Based Interaction Outcome Prediction Methods and System," the entire contents of each of which is incorporated herein in its entirety by express reference thereto.

The database module 305 contains the aggregated summary of scores across the six personality types in a linguistic model and predicts which personality type the customer is most likely to be. The aggregated summary of scores weighs certain communications differently to predict the personality type of the customer in one embodiment. For example, if there are multiple calls from a single telephone number, more recent calls are given more weight than older calls. Also, the time of day can be taken into account to predict personality type of the customer if more than one personality type is associated with a single telephone number. For example, if the telephone number is associated with an emotions based customer during the day, and a thoughts based customer at night, the database module 305 can return a customer personality type prediction based on that pattern.

In one embodiment, the prediction of customer profile (e.g., based on personality type) is based on past calls or communications to that contact center and other organizations. For instance, the prediction can be based on previous transactions between the customer and contact center, the answers to menu choices, past purchase history, past calling history, past survey responses, etc. These histories can be general, such as the customer's general history for purchasing products, average contact time with an agent, or average customer satisfaction ratings. This prediction can be created and/or stored in the database module 305 from past interactions with the current customer.

The prediction of one or more profiles for one or more future customers is based, in one embodiment, on historical customer communications, which are analyzed to determine profile patterns. For example, data regarding customer profiles (e.g., gender, task type, personality type, distress level, etc.) at specific times of the day and specific days of the week are aggregated and organized into a matrix. This data is used to determine the probability that a customer with a certain profile will contact the contact center 100 at a certain time, and the frequency that a customer with a certain profile will contact the contact center 100. In some embodiments, the profile prediction for one or more future customers is made for a predetermined number of customers (e.g., the next 10-15 customers), a predetermined amount of time (e.g., the next 30 minutes), or both.

In some embodiments, the current customer is a repeat customer and already has a customer profile associated with the identifying origination data that was stored. When the database module 305 receives the identifying origination data, it retrieves the pre-existing customer profile so that it can be used in the next step. In other embodiments where no customer profile exists or it cannot be readily identified, the database module 305 can predict the incoming customer profile for further use. In another embodiment, the predictive algorithm can be updated based on a repeat customer profile identified and retrieved by the database module 305.

In various embodiments, one or more copies of the database module 305 may be housed close to or in the contact center 100 to decrease the time needed to transfer the information from the database module 305 to the routing module 315 (when the routing module 315 is integrated in contact center 100), and to help minimize router decision time. The original may be stored at an analytics center or datafarm site. Because the database module 305 is typically very large, the data should be carefully structured so that the database module 305 can return results within a very short period of time, as the data returned from the database module 305 is used to route the customer communication or task to an agent. When the original or a copy are stored near the contact center 100, the database module 305 may be mirrored at the contact center 100 to improve result times, and any copies may be updated periodically (e.g., weekly) with new customer data. In some embodiments, the database module 305 is updated and copied out every night.

The governor module 310 monitors agent workload and stops assigning customer tasks to agents once agents have exceeded a predetermined work threshold. This can be based on, e.g., legal requirements, such as a maximum permitted workweek, agent preference, determination of an optimum maximum threshold beyond which performance degrades, or the like, or any combination thereof. In some embodiments, governor module 310 is in communication with an agent queue of contact center 100. The governor module 310 calculates the amount of utilization time for each agent, so that once agents have reached a predetermined work threshold they will be taken out of the queue for assignment by the routing module 315 until their occupancy level drops below the predetermined work threshold. In some embodiments, the utilization calculations are done in real-time. "Utilization time," as used herein, means the time agents spend communicating with a customer and time spent doing additional customer related tasks after the communication.

Occupancy level is calculated using the following equation:

Utilization time/logged in time.

When the governor module 310 is queried by the contact center 100 to return a list of currently available agents for an incoming customer task, agents that are above the predetermined work threshold are excluded from the group considered for the task, and the remaining agents are ranked. In certain embodiments, the currently available agents are ranked based on their proficiency for handling customers with the pre-existing profile, predicted profile (e.g., personality type) and/or the type of task.

Exemplary aspects of agent proficiency include one or more of: agent effectiveness (e.g., X % of customers serviced by agent have a favorable outcome for the customer and/or contact center), revenue generating proficiency (e.g., $Y generated by the agent per serviced customer), customer satisfaction level (e.g., Z % of customers serviced by agent received at least a satisfactory customer satisfaction level rating), speed (e.g., average customer service time for agent is W minutes/contact, U % of customers are serviced within V minutes), efficiency (e.g., T % of customers serviced by agent are one-and-done), experience (e.g., number of months/years agent has serviced customers), cross-sell ability (e.g., S % of customers serviced by agent result in additional revenue due to cross-selling), personal satisfaction (e.g., the agent most prefers serving work items of skill X rather than work items of skill Y), proficiency at closing a transaction, and occupancy (e.g., select the agent who has worked less over a specified period to service a work item), or any combination thereof. Other data that can additionally or alternatively be used in the embodiment above or various alternative embodiments to determine agent proficiency include the transaction or task type (e.g., catalog sale, information request, complaint, etc.), the time-of-day, the result (e.g., the type of sale, the number of units sold, revenue generated, service ticket closure or escalation, the information provided, etc.), a self-rating of the servicing agent respecting the agent's proficiency in handling the customer, the rating of the customer of the agent's proficiency in handling the customer, the rating of another party, such as the agent's supervisor or another observer, of how the customer was serviced. Although only one exemplary metric has been provided for each proficiency aspect, it is to be understood that each aspect can be a composite of multiple different metrics. For example, the effectiveness of an agent can be a function of the percent of customers having a successful outcome, the average value realized for each customer, and the average customer feedback score. Stated another way, it is possible for one proficiency aspect to be a function, at least in part, of another proficiency aspect.

In one embodiment, when all agents are working above the predetermined work threshold, a routing recommendation may not be provided. Instead, a supervisor or other authorized user may raise the predetermined work threshold to a higher second predetermined work threshold. In certain embodiments, the authorized user has the ability to adjust the governor module 310 at any time. A routing recommendation may then be provided based on the higher second predetermined work threshold.

In another embodiment, the governor module 310 recognizes that all agents are above the occupancy level and continues to make routing recommendations. The governor module 310 can automatically raise the predetermined threshold to a higher second predetermined work threshold that is triggered when all agents are above the initial predetermined work threshold.

The governor module 310 dynamically determines occupancy rate in real time, or near-real time. For example, near-real time may be necessitated by communication delays between inputs from a contact center and receipt and processing by an analytics center, causing a delay, e.g., of about 1 to 10 seconds. Once an agent's occupancy rate falls below the adapted threshold, that agent will be returned to the queue. For example, if the predetermined work threshold is 75%, and an agent's occupancy level is 85%, that agent will be taken out of the queue. Once the agent's occupancy level is below 75%, the agent is placed back in the queue by the governor module.

In various embodiments, the governor module 310 is integrated with a contact center's existing environment, communication distributor hardware, and software. The governor module 310 does not handle call control or reserve agents, but informs the communication distributor of a contact center which agents should be taken out of the queue. The governor module 310 tracks agent utilization for all agents in the queue and measures agent availability and agent occupancy.

In certain embodiments, the governor module 310 allows the occupancy level to be adjusted to a customized level that is called the "adapted threshold." The industry standard is presently about an 80-85% adapted threshold for full utilization. The occupancy level customization for the adapted threshold also allows occupancy to be attributed in different ways for different types of incoming customer tasks. For example, agents receiving complaint calls can have a different threshold than sales call agents. In addition, the threshold can be set differently based on agent skills and communication type, so that top quartile sales agents will be worked to 85% occupancy and the rest of the agents to 80% occupancy or some other lower occupancy. The threshold may also be set based on personality type, so that the governor module 310 may use a different threshold if there is an 80% utilized agent, but is a top quartile thoughts-based agent.

The governor module 310 also monitors agents that are assisting customers and not currently available, i.e., "expected available agents." The governor module 310 determines when an agent is expected to be available based on, for example, the task type, distress level of customer, time already spent with the customer, expected time to finish, etc. This information is sent to the database module 305 so that agent data (e.g., the expected available agent's proficiency at handling customers) can be retrieved and analyzed, along with the profile of future customers.

The routing module 315 matches incoming customer communications and their related customer personality profile with currently available agents and expected available agents. The match-ups can be made based on, for example, pre-existing customer profiles, the customer profile prediction, and information from an agent database that includes the agent's proficiency scores for handling customers with that personality profile. The match-ups can also be made based on a number of other factors, such as the type of task, the agent's training, and the agent's workload.

The routing module 315 reviews the predicted profile or pre-existing profile of the current customer, the predicted profile of one or more future customer(s), an available agent's proficiency at handling a customer with the predicted or pre-existing profile of the current customer and a customer with the predicted profile(s) of the future customer(s), and an expected available agent's proficiency at handling a customer with the predicted or pre-existing profile of the current customer and a customer with the predicted profile(s) of the future customer(s). For example, assume the predicted or pre-existing profile of a current customer is a thoughts-based caller, and the predicted profile of a future customer is an emotions-based caller. The currently available agent is proficient at handling an emotions-based caller, but not a thoughts-based caller. An expected available agent, however, is proficient at handling both a thoughts-based caller and an emotions-based caller. Instead of routing the current customer to the currently available agent, the routing module 315 routes the current customer to the expected available agent, which frees up the currently available agent for the future customer. In this way, the routing of customer communications is optimized. This can advantageously permit at least one future customer to receive a currently available agent who is better at communicating with, or resolving the concerns of, such future customer than if the currently available agent is routed to a present customer.

In various embodiments, the routing module 315 determines the variability in the available agents' and expected available agents' proficiency at handling customers with the predicted or pre-existing profiles. By "variability" is meant the difference in skill in handling different types of customers. For example, an agent that has a low degree of variability is typically highly desired and capable of handling customers with several different profiles, and an agent with a high degree of variability is capable of only handling customers with certain profiles well but can only handle other types of customers very poorly (based on past selected criteria). An agent that exhibits a low degree of variability is consistent across many different customer profiles.

Depending on the situation, the routing module 315 will route the customer communication to the agent with a low degree of variability or save this agent for a future customer. For instance, assume a thoughts-based caller is the current customer, and the agent with a low degree of variability is available (e.g., capable of handling a thought-based caller or an emotions-based caller with almost equal skill). An expected available agent has a high degree of variability, so he or she is also capable of handling the thoughts-based caller, but not as well as an emotions-based caller. A future caller is predicted to be an emotions-based caller. The routing module 315 will save the agent with the low degree of variability for the future caller with the predicted profile that better matches the currently available agent, and route the current customer to the expected available agent. It should be understood that other customer profile or agent profile characteristics described herein may be used to select the current and/or future profiles and/or agent rankings or routing recommendations.

In one embodiment, routing module 315 is in communication with the communication distributor of the contact center. Routing module 315 provides a routing recommendation to the communication distributor, which can then distribute the customer task to the best available agent.

In certain embodiments, the routing module 315 provides a route summary including the number of routes produced, the number of times the recommended routes were adopted, and an estimate of the amount of money saved. In some embodiments, the routing module 315 provides real-time hourly and daily reporting. The reporting function of the routing module 315 allows the contact center to see that the routing module 315 is actually providing routing recommendations for routing customer contacts, rather than having a default system (e.g., communication distributor of the contact center) route the customer contacts.

In other embodiments, the routing module 315 may include a simulator that shows simulated routing on top of the default system, so that the contact center can compare the default system to the routing module 315.

Analytics module 320 analyzes customer-agent interaction during the customer task. If the task involves speaking or other forms of voice-based communication, snippets of that communication are sent to an analytics server to analyze the task interaction as it is happening. This gives the agent more information about the customer and provides a more accurate secondary routing personality prediction so that, if the task requires additional routing during the customer contact, the routing module 315 or an agent can use that information to provide routing recommendations regarding the best available agent. Information that may be determined by the analytics module 320 includes, without limitation, personality type of the customer, engagement, state of mind, distress, life events, and purpose of contact/task.

Figure 4:
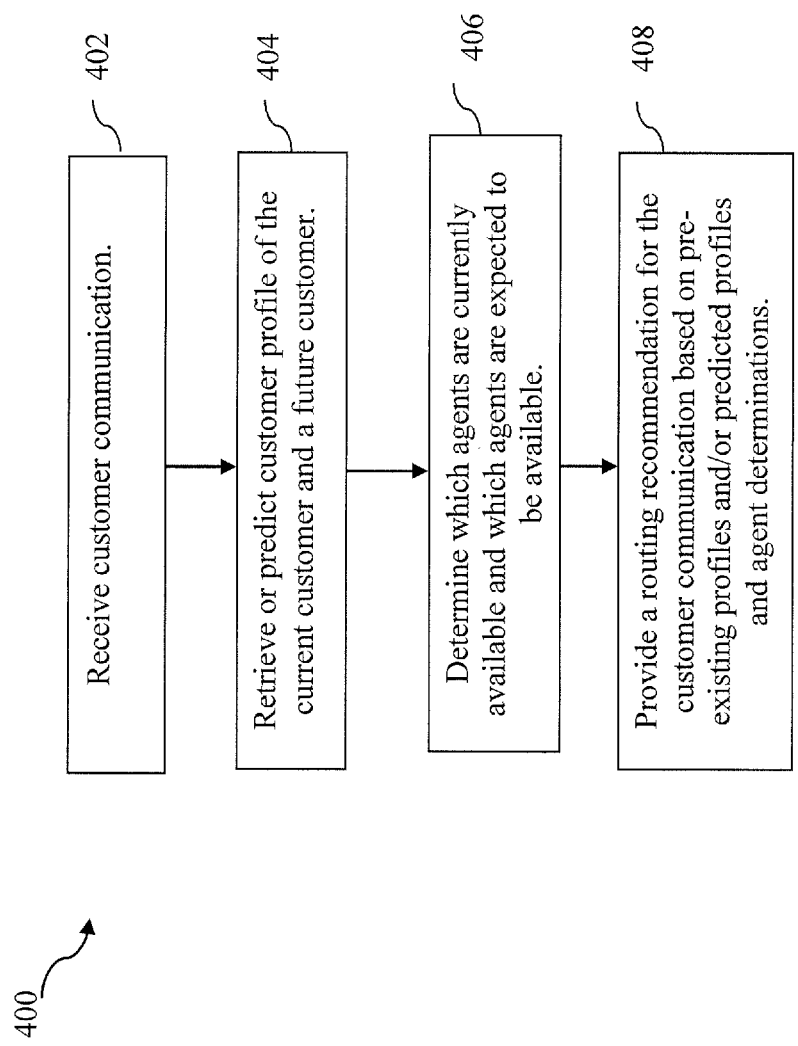
FIG. 4 is a flowchart illustrating a preferred method of optimizing the routing of customer communications according to aspects of the present disclosure.

An exemplary method 400 of optimizing the routing of customer tasks or communications will now be described with respect to FIG. 4. At step 402, a customer communication or task is received at contact center 100. Again in FIG. 4, the contact center 100 in one embodiment may be replaced by, or be associated with, an analytics center 120 as seen in FIG. 3. The communication type may include voice calls, voice over IP, facsimiles, emails, web page submissions, internet chat sessions, wireless messages (e.g., text messages such as SMS (short messaging system) messages or paper messages), short message service (SMS), multimedia message service (MMS), or social media (e.g., Facebook identifier, Twitter identifier, etc.), IVR telephone sessions, voicemail messages (including emailed voice attachments), or any combination thereof.

The database module 305 then receives a request from the contact center 100 including identifying origination data of the customer. At step 404, the database module 305 retrieves the pre-existing customer profile of the current customer (based on the identifying origination data), or predicts the customer profile of the current customer and a future customer. In one embodiment, the database module 305 associates the identifying origination data with a prediction of the profile of the current customer. The database module 305 accesses and retrieves customer characteristics and scores and provides the governor module 310 and routing module 315 with this information. In one embodiment, it provides a prediction of the customer personality type. In another embodiment, it provides the customer personality type. In various embodiments, the database module 305 predicts profiles of future customers based on past customer communications to determine profile patterns. By analyzing this data, the probability that another customer will call, and the likelihood that a future customer will exhibit a certain profile (e.g., gender, personality type, task type, age, income level, education, etc.) can be determined.

At step 406, the governor module 310 determines which agents are currently available and which agents are expected to be available. In one embodiment, the currently available agents and expected available agents are determined by reviewing the occupancy level of agents, e.g., by obtaining agent data from the contact center 100. The governor module 310 dynamically monitors occupancy level of the agents to determine availability and addresses the real-time performance metrics of the agent. This real-time (or near-real time) dynamic data is typically used to select a destination for the customer communication. Unlike conventional sequential routing schemes, preference in this embodiment is based on both current and future customer information and agent availability so that contact center performance is optimized, e.g., while accounting for predicted agent workloads and skills. The routing recommendation is based not only on current needs, but also on anticipated future needs.

The governor module 310 prepares a list of currently available agents and expected available agents, and ranks the agents based on certain selected criteria, e.g., agent's proficiency in handling customers with the predicted profiles and/or pre-existing profiles. Currently available agents are those agents who have not exceeded a predetermined work threshold. This list of currently available agents and expected available agents is provided to routing module 315. The governor module 310 also sends this list to the database module 305, which retrieves these agents' proficiencies at handling customers with the predicted profiles and/or pre-existing profiles.

At step 408, the routing module 315 provides a routing recommendation that matches the customer communication to an agent (e.g., a currently available agent or an expected available agent). Based on the customer profile prediction type, pre-existing customer profile type, currently available agents, expected available agents, agent data, task type (which may be from IVR), customer data, customer contact events, environmental events, etc., the routing module 315 provides the communication distributor of the contact center with an agent suited to take the customer communication. Agent data includes, but is not limited to agent performance metrics, tenure, agent personality type analytics scores, and other data about the agent. Customer data includes, but is not limited to, customer ID, account history with the contact center, customer contact frequency or history (including prior instances of distress), and other relevant available customer attributes.

The routing module 315 may make routing decisions based on comparing various customer data and agent data, which may include, e.g., performance based data, demographic data, psychographic data, and other business-relevant data. The routing module 315 assesses the skills of agents to establish which agents possess the skills that are most needed for the customer communication. Because the routing decision is focused mostly on selection of the most proficient agent for the returning customer and/or predicted future customer seeking contact, the wait time of customers may be increased. Thus, in various embodiments, the routing module 315 also considers the wait time in the routing decision and can seek to minimize this wait time, as well.

After the customer task is routed to an initial agent, the contact center 100 may create a text of the initial customer-agent interaction. The contact center 100 sends a text of the customer interaction to the analytics server of analytic module 320, which will then return information regarding customer personality type to build an updated profile of the customer in near real-time. Alternatively, in an unshown embodiment, the analytics center 120 receives the initial customer-agent interaction, or a text thereof, for processing by the analytics server of analytic module 230. If the customer contact is a telephone call, the audio of the call can be recorded, transmitted and analyzed. If the customer communication is already text based (online chat, email, social media contact, text message, etc.), then the text can be sent directly to the analytics module 320 and processed similarly. For example, the analytics server can analyze the extracted text to identify one or more customer issues. These issues may require attention and be routed appropriately, or may be used to create a new prediction for that customer that is stored in the national database or other appropriate database.

The analytics server of the analytics module 320 may use the following inputs to create the updated customer profile: text, linguistic algorithms (distress, personality styles, life events, engagements), previously stored results, and the results of additional analytics added to the profile, and any combination thereof. The analytics server creates a profile of the customer progressively based on these small segments during the customer interaction. The updated customer profile is sent to the routing module 315, so that if the customer needs to be transferred to a second agent, the routing module 315 can use the newly updated profile of the customer to determine which available agents are the best agents for the transfer.

The real-time (or near real-time) routing function of method 400 can operate on both the initial agent assignment and possible secondary transfer agent assignment. A communication distributor of a contact center assigns each incoming communication to the agent who is the best match for the communications based on inputs from database module 305, the governor module 310, the routing module 315, and a database containing agent personality information and customer personality information. In some embodiments, inputs from the analytics module 320 are also used.

Figure 5:
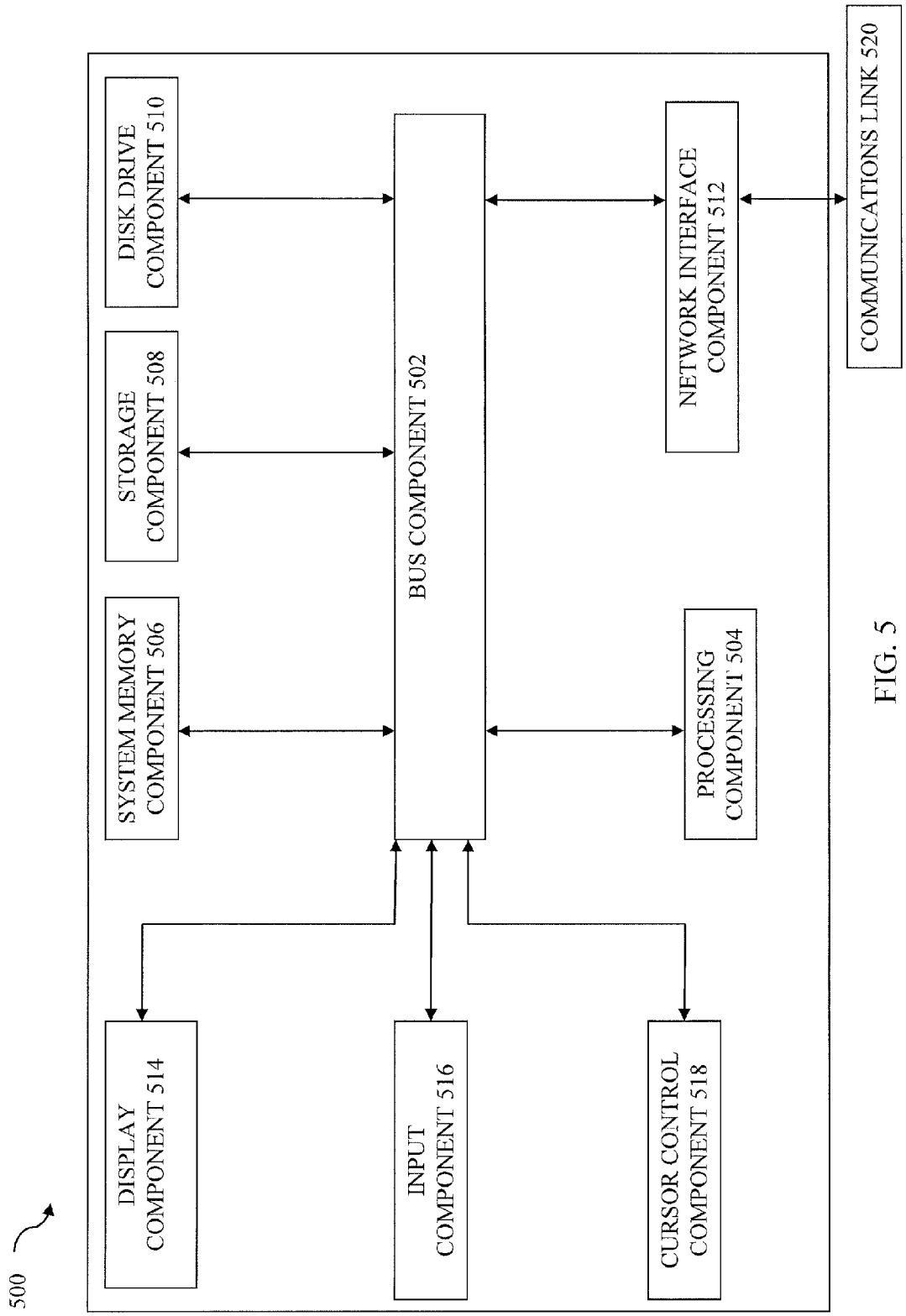
FIG. 5 is a block diagram of a computer system suitable for implementing one or more components in FIG. 3 according to one embodiment of the present disclosure.

Referring now to FIG. 5, illustrated is a block diagram of a system 500 suitable for implementing embodiments of the present disclosure, including database module 305, governor module 310, routing module 315, and analytics module 320 depicted in FIG. 3. System 500, such as part a computer and/or a network server, includes a bus 502 or other communication mechanism for communicating information, which interconnects subsystems and components, including one or more of a processing component 504 (e.g., processor, microcontroller, digital signal processor (DSP), etc.), a system memory component 506 (e.g., RAM), a static storage component 508 (e.g., ROM), a network interface component 512, a display component 514 (or alternatively, an interface to an external display), an input component 516 (e.g., keypad or keyboard), and a cursor control component 518 (e.g., a mouse pad).

In accordance with embodiments of the present disclosure, system 500 performs specific operations by processor 504 executing one or more sequences of one or more instructions contained in system memory component 506. Such instructions may be read into system memory component 506 from another computer readable medium, such as static storage component 508. These may include instructions to retrieve a pre-existing customer profile of a current customer, predict a customer profile of a current and future customer, determine agents that are currently available and expected to be available, and provide a routing recommendation based on these factors, etc. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 504 for execution. Such a medium may take many forms, including but not limited to, non-volatile media, volatile media, and transmission media. In various implementations, volatile media includes dynamic memory, such as system memory component 506, and transmission media includes coaxial cables, copper wire, and fiber optics, including wires that comprise bus 502. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 500. In various other embodiments, a plurality of systems 500 coupled by communication link 520 (e.g., networks 102 or 104 of FIG. 1, LAN, WLAN, PTSN, or various other wired or wireless networks) may perform instruction sequences to practice the disclosure in coordination with one another. Computer system 500 may transmit and receive messages, data, information and instructions, including one or more programs (i.e., application code) through communication link 520 and communication interface 512. Received program code may be executed by processor 504 as received and/or stored in disk drive component 510 or some other non-volatile storage component for execution.

In view of the present disclosure, it will be appreciated that various methods and systems have been described according to one or more embodiments for routing incoming customer communications and tasks.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure.

Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow a quick determination of the nature of the technical disclosure. It is submitted with the understanding that it will not be used to interpret or limit the scope or meaning of the claims.

What is claimed is:

1. A system configured to optimize the routing of incoming customer communications, comprising:
    a node comprising a processor and a non-transitory computer readable medium operably coupled thereto, the non-transitory computer readable medium comprising a plurality of instructions stored in association therewith that are accessible to, and executable by, the processor, where the plurality of instructions comprises:
    instructions, that when executed, receive a customer communication;
    instructions, that when executed, retrieve or predict a first profile of the customer associated with the customer communication and predict a second profile of a future customer;
    instructions, that when executed, provide a routing recommendation to a communication distributor based on the retrieved or predicted first profile, the predicted second profile, and currently available agents' and expected available agents' proficiency at handling customers with the retrieved or predicted profiles; and
    instructions, that when executed, route the customer communication via the communication distributor to an agent based on the routing recommendation.

2. The system of claim 1, wherein the retrieved and predicted customer profiles each comprise one or more of a personality type, gender, task type, likelihood of purchase, contact time, likelihood of attrition or account closure, and/or customer satisfaction.

3. The system of claim 1, wherein the instructions, that when executed, predict the first and second profiles comprise instructions, that when executed, analyze historical customer communications to determine profile patterns.

4. The system of claim 3, wherein the instructions, that when executed, analyze historical customer communications comprise instructions, that when executed, estimate a frequency that a communication from a customer with a pre-selected second profile will be received.

5. The system of claim 1, wherein the instructions, that when executed, predict the first and second profiles comprise instructions, that when executed, determine a second profile based on a predetermined number of customers or for future customers over a predetermined amount of time, or a combination thereof.

6. The system of claim 1, which further comprises instructions, that when executed determine variability in the currently available agents' and expected available agents' proficiency at handling customers with the retrieved and/or predicted first and second profiles.

7. The system of claim 1, wherein, if a currently available agent is proficient at handling a current customer and an expected future customer, and an expected available agent is proficient at handling a current customer and is not as proficient at handling the expected future customer, then the instructions, that when executed, provide the routing recommendation recommend routing the expected available agent to the current customer.

8. A system for optimizing the routing of incoming customer communications, comprising:
    a storage device storing a computer readable program; and
    a processor executing the computer readable program comprising:
        a database module to retrieve a first profile of a current customer or predict the first profile of a current customer, and predict a second profile of a future customer based on historical customer communications or identifying origination data, each of the historical customer communications or identifying origination data being based on a plurality of customers that are analyzed to determine a profile pattern;
        a governor module to monitor agent work load and provide a list of currently available agents and agents expected to be available;
        a routing module to match customer communications to agents based on the retrieved or predicted first profile of the current customer and the predicted second profile of the future customer, and the currently available agents' and expected available agents' proficiency at handling customers with the retrieved or predicted profiles; and
        a communication distributor that routes each customer communication to an agent based on the routing module match.

9. The system of claim 8, further comprising an analytics module to analyze real-time interaction between an agent and customer.

10. An analytics center comprising the system of claim 8.

11. A method to optimize routing incoming customer communications, which comprises:
    receiving, by one or more processors, a customer communication;
    retrieving or predicting, by one or more processors, a first profile of the customer associated with the customer communication;
    predicting, by one or more processors, a second profile of a future customer;

determining, by one or more processors, which agents are currently available and which agents are expected to be available; and providing, by one or more processors, a routing recommendation to a communication distributor based on the retrieved or predicted first profile and the predicted second profile, and the currently available agents' and expected available agents' proficiency at handling customers with the retrieved or predicted profiles, wherein the communication distributor routes the customer communication to an agent based on the routing recommendation.

12. The method of claim 11, wherein the retrieved or predicted profiles each comprise one or more of personality type, gender, task type, likelihood of purchase, contact time, likelihood of attrition or account closure, and/or customer satisfaction.

13. The method of claim 11, wherein predicting the first and second profiles comprises analyzing historical customer communications to determine profile patterns.

14. The method of claim 13, wherein predicting the second profile comprises estimating a frequency that a communication from a customer with a pre-selected profile will be received.

15. The method of claim 14, wherein the pre-selected profile comprises a personality type.

16. The method of claim 11, wherein predicting the second profile of the future customer comprises determining the profile of a predetermined number of customers, determining the profile of future customers over a predetermined amount of time, or a combination thereof.

17. The method of claim 11, which further comprises determining variability in the currently available agents' and expected available agents' proficiency at handling customers.

18. The method of claim 11, wherein, if a currently available agent is proficient at handling a current customer and an expected future customer, and an expected available agent is proficient at handling a current customer and is not as proficient at handling the expected future customer, then providing a routing recommendation includes recommending the expected available agent to the current customer.

19. The method of claim 11, wherein the proficiency of handling customers with a retrieved and/or predicted profile is independently determined for the currently available agent and the expected available agent by a method comprising: independently ranking an overall proficiency of the currently available and expected available agents for the future customer based on at least one personality type, and selecting the currently available agent or expected available agent having the lower variability relative to the other to reserve for a future customer.

20. A non-transitory computer readable medium comprising a plurality of instructions comprising:

instructions, that when executed, receive a customer communication;

instructions, that when executed, retrieve or predict a first profile of the customer associated with the customer communication and predict a second profile of a future customer;

instructions, that when executed, determine which agents are currently available and which agents are expected to be available;

instructions, that when executed, determine the currently available agents' and expected available agents' proficiency at handling customers with the predicted second profile;

instructions, that when executed, provide a recommendation that directs the customer communication to an agent based on the retrieved or predicted first profile of the current customer and the predicted second profile of the future customer, and the currently available agents' and expected available agents' proficiency at handling customers with the retrieved or predicted first and second profiles; and instructions, that when executed, to route the customer communication via a communications distributor to an agent based on the recommendation.

21. The non-transitory computer readable medium of claim 20, wherein the first and second profile each comprises personality type, gender, task type, likelihood of purchase, contact time, likelihood of attrition or account closure, and/or customer satisfaction.

22. The non-transitory computer readable medium of claim 20, wherein the instructions, that when executed, predict the first profile of the customer associated with the customer communication and the second profile of a future customer comprise instructions, that when executed, analyze historical customer communications to determine profile patterns.

23. The non-transitory computer readable medium of claim 22, wherein the instructions, that when executed, predict the first profile of the customer associated with the customer communication and the second profile of a future customer comprise instructions, that when executed, estimate a frequency of customers with a profile different from a current customer.

24. The non-transitory computer readable medium of claim 20, wherein the instructions, that when executed, predict the first profile of the customer associated with the customer communication and the second profile of a future customer comprise instructions, that when executed, determining the profile of a predetermined number of customers, customers for a predetermined amount of time, or a combination thereof.

25. The non-transitory computer readable medium of claim 20, further comprising instructions, that when executed, determine a level of variability in the currently available agents' and expected available agents' proficiency at handling customers.

26. The non-transitory computer readable medium of claim 25, wherein if a currently available agent is proficient at handling a current customer and an expected future customer, and an expected available agent is proficient at handling a current customer but is not as proficient as the available agent at handling the expected future customer. the routing recommendation recommends the expected available agent to the current customer.

* * * * *